United States Patent
Asker et al.

[15] 3,664,095
[45] May 23, 1972

[54] EXCHANGE PACKING ELEMENT

[72] Inventors: Gunnar C. F. Asker; Maurice A. Hubscher, both of 18 Industrial Drive, Trenton, N.J.

[22] Filed: Oct. 21, 1968

[21] Appl. No.: 768,995

[52] U.S. Cl..............................55/387, 55/524, 210/501, 210/502, 210/506
[51] Int. Cl..........................................B01d 53/02
[58] Field of Search....................55/387–389, 524; 210/36, 506, 501, 502

[56] References Cited

UNITED STATES PATENTS

| | | | |
|---|---|---|---|
| 2,038,071 | 4/1936 | Wilhelm | 53/388 X |
| 2,785,805 | 3/1957 | Hough | 210/36 X |
| 2,906,512 | 9/1959 | Meek | 55/524 X |
| 3,238,056 | 3/1966 | Pall et al. | 210/506 X |

Primary Examiner—John Adee
Attorney—Sol B. Wiczer

[57] ABSTRACT

A packing for fluid treatment, either gaseous or liquid, for various surface contact effects such as drying of the fluid, heat exchange, ion exchange, molecular sieve separations and the like, wherein a laminated cellular structure of paper is coated throughout the cellular structure with a hard resin such as an epoxy resin in which such resin coating can be used alone for heat exchange purposes, or it can be further coated with dry solids to effect many of the fluid modifications.

13 Claims, 6 Drawing Figures

Patented May 23, 1972

3,664,095

INVENTORS
GUNNAR C. F. ASKER
MAURICE A. HUBSCHER
BY

Sol B Wiger
ATTORNEY

EXCHANGE PACKING ELEMENT

This invention relates to a heat, moisture, or fluid exchange element termed a packing, formed of paper coated with a non-porous, hard-setting resin such as epoxy, polyester, polyacrylic acid and their lower alkyl esters, polyamides, polystyrene and mixed styrenes and acrylonitrile.

More particularly, this invention relates to a packing material whose body is strong paper, usually a porous, heavy, absorbent sulfite or sulfate such as a kraft-type paper, coated with liquid hardenable resin, and mechanically converted to cellular corrugated form. Most typically the resin-coated papers are assembled as layers of corrugated paper, each separated by a sheet of plane paper coated by the resin. Each corrugation forms a cell extending from side to side of the body, the resin coating upon the paper being cured in this cellular form. Alternately the corrugated paper can have the bottom of each corrugation adhered to a corresponding top hump of the corrugation of the next adjacent layer. The net effect in either case is to convert corrugated paper into a cellular laminated, fire-resistant body through which fluid can pass from side to side without interchange laterally between cells. The paper is usually sufficiently absorbent and porous by being unsized in a manner that might reduce the porosity, and the strength of the paper body is imparted by the hard set resin coating thereon.

The invention herein represents a specific improvement in the art of corrugated packings in that the porous paper per se acts as a heat insulator, while the hard resinous coating thereon acts usually as a heat transferring the conductive body, whereby the packing has great utility not only in heat and moisture transfer, but also sometimes, as will appear, in use of the packing for treatment of fluids passing from side to side through the cells for chemical modification of their fluid substance. This modification may be removal of some of the fluid components or liquids such as moisture or dissolved liquids or solids in the fluid, such as by ion exchange.

The outstanding characteristic of the packing hereof is that it is formed of cellulose fiber into paper sheets which is highly economic as a raw material. The paper sheets are usually formed of matted, unfilled fiber having inherent porosity in the unfilled paper in sheet form. The pores formed between the fibers, generally are non heat conductive because the trapped minute air spaces between fibers have an insulating effect. Such fibrous sheets are given an even outer coating of a hard-setting resin, such as enumerated above, preferably an epoxy resin, and each sheet may then be formed in the uncured state as a wet, green coated sheet having the liquid resin coated on both upper and lower surfaces thereof as a thin film, into a corrugated sheet. The corrugated sheets are finally formed into a laminate, either as a rotary spiral or flat tier laminated cellular body, of which each cell comprises a corrugation extending from side to side of the laminated body. The coating then sets to a hard film, thus providing a very strong packing structure and the resin itself serves to impart great strength to the corrugated cellular paper. The resin also protects the fibers from becoming softened by wetting or absorption by the paper fiber of moisture with any fluids passing through the cellular structure.

In an alternate procedure, the paper, after assembling into a corrugated body, can then be dipped into the liquid resin, such as the epoxy or other resins listed above. The coating resins are maintained liquid prior to use by being at an intermediate polymeric stage, such as monomeric stage of polymerization. Usually a polymerizing catalyst is added to the liquid resin just prior to treatment of the fiber to set the resin, and the corrugated body is then dipped into the liquid, thereby coating the cellular surfaces with the liquid resin, which is then allowed to drain and finally set to a strong cellular structure. The resin can also be fully polymerized and dissolved in a solvent which is evaporated to set the resin as a coating upon the fiber sheet.

It is sometimes desirable to impart to the packing moisture-absorptive or moisture-evolving properties such as are available in powdered or granular desiccant materials which are sprayed or dusted upon the wet, tacky plastic coating prior to its final setting, the dusting of the solids thereon being applied evenly throughout the cellular structure so as to adhere to the surface of the wet coated body and impart thereto the properties of the powdered or granular material.

Such moisture-absorptive powdered material may typically be a dried and powdered hydrous alumina, silica, titania or ferrous hydroxide which are known to be highly moisture absorptive when precipitated from the solution and dried. Such moisture absorptive materials are granulated or powdered and then dusted upon the tacky surface of the plastic coated cellular packing to impart moisture-absorptive properties to the interior surfaces of the coated cells.

In an alternate procedure, it is possible to impart to the resin, acid, base or mineral-exchange characteristics available in various earths, which are added cohered to the resin surface in the powdered or granular form to impart the characteristics inherently available in such solids. Typically these solids comprise various decolorizing clays such as Fuller's earth, diatomaceous earth, or ion exchange earths such as permutite; or molecular sieves having the property of absorbing minerals, or performing selective absorptions from fluids of mineral or liquid character mixed with the fluid passed through the cellular packing body. Such solid absorptive or fluid-modifying bodies may be similarly powdered or granulated and dusted upon the wet, tacky, resin-coated packing for purposes of imparting the usual characteristics of the powdered substance to modify the fluid passing through the cells. The cellular body serves as a strong body of large cellular surfaces of optimum structure to support the powdered or granular material in efficient fluid contact with the fluid to be treated. The paper pores serve to reduce heat exchange throughout the body and thus inhibit transverse flow of both fluid and heat therethrough in both the absorption and desorption phases, as is usual in use of such packings.

Moreover, the resin per se can be modified such as by sulfonation or amination to convert the chemical substance thereof to have ion-exchange properties, whereby acidic substances will be absorbed from fluid passed through the cells by the acid ion exchangers, or basic substances will be absorbed from the fluid stream by acid ion exchanger contact therewith. In some instances the ordinary ion exchange resins are in liquid form modified to have hardening properties as a coating upon paper and may be applied as the resin coating using such typical resins as the amberlites and other well known ion exchange resins for this purpose.

When used to absorb moisture, the present structure, wherein granular hydrous oxide desiccant materials such as silica gel are carried as a coating adhered to the cellular surfaces by the resin, enables the gas drying and desorption to proceed at a high surface velocity. Such use of desiccant overcomes problems in the art associated with the use of deliquescent desiccant salts such as lithium halides that had been heretofore used in other gas drying applications.

Figure 1:
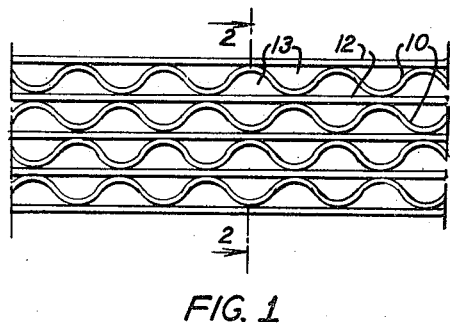
FIG. 1 shows an end view of a laminated assembly of corrugated paper alternating and adhered to intermediate flat sheets of paper as an overall structure.

Referring first to FIG. 1, the laminated body may consist of ordinary corrugated paper 10 alternating with flat plane sheets of paper 12 to form cellular spaces 13 between the corrugated sheets. These cells extend from one side A where the gas may enter according to arrow 14 to FIG. 2, and the fluid passes freely through the cellular body being emitted at the side B, according to arrow 15. The cellular paper laminate may be assembled in plane stacks as shown in FIG. 1 to any height of width useful for fluid treatment; for instance, in gas drying such as illustrated in my prior U.S. Pat. Nos. 3,204,388 3,199,673 or 3,159,354, wherein granular bodies are used as a bed shaped to a structure to absorb moisture from gases passed therethrough.

According to the present invention, the cellular bodies herein described have a similar but much broader utility since any fluid may be passed through the cells of the structure as described above, and have its character modified either by removal of moisture or by having moisture added thereto or, indeed, the device may be a simple fluid heat exchange device, not modified in any way except to exchange temperature.

Figure 6:
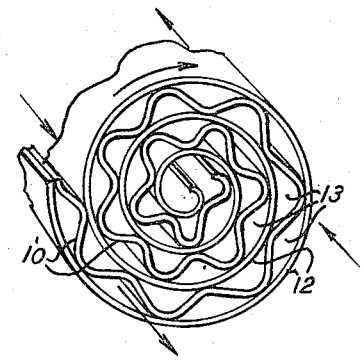
FIG. 6 illustrates a rotary type of packing similarly comprising a porous insulation paper coated with a hard resin upon which may further be coated fine powder or granules.
Figure 4:
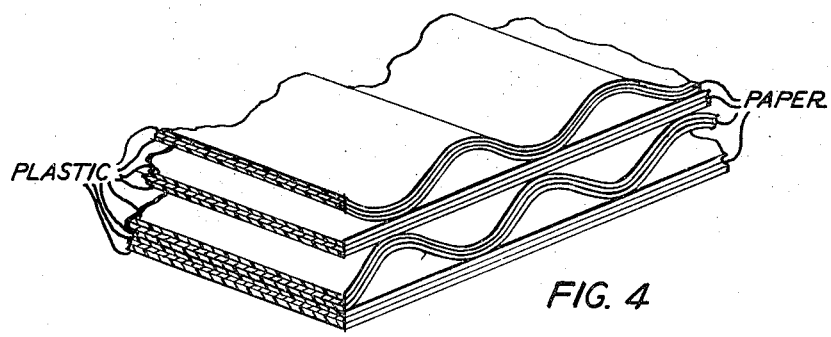
FIG. 4 illustrates the structure of FIGS. 1 and 2 in greater detail showing the corrugated fibrous paper laminate of the structure having a coating of hard resin on the surface.

In an alternate and just as common structure, each corrugated sheet may be coiled into a laminated structure as shown in FIG. 6. In the structure of FIG. 6, a portion of the fluid may pass axially from end to end as in FIG. 2, near one radial side of the lamination; for instance, at high temperature for heat exchange and another body of cold fluid can simultaneously be passed axially near the opposite radial side often in an opposite direction, as shown by the arrows of FIG. 6. The whole coiled body is rotated so that hot fluid enters and leaves from one radial side of the rotary body, moving axially therethrough and another independent cold fluid passes through the opposite radial side and out of the open cellular end of the laminated rotary body. Thus, two fluids are simultaneously passed through the cellular rotary packing in the same or opposite direction, each through the opposite radial sides, for several purposes.

For instance, one fluid may be hot and heat the side through which it passes and the other fluid may be cool so that it will cool the radial side through which it passes, both fluids passing continuously, one cooling and the other heating. As the cellular body rotates, the heated portion becomes progressively cooled by the cooled gas continuously contacting the same as it rotates into the cooling zone, and the cooled portion encountering the hot fluid in the heating zone becomes heated in contact with the hot fluid passing through the hot radial side.

In another use, one fluid may be of high moisture content and may be dehumidified in passage through one side, while the fluid passing through the opposite side is heated enough to operate as a scavenger gas to remove the moisture that was absorbed from the first fluid, each fluid passing as an independent stream.

Figure 3:
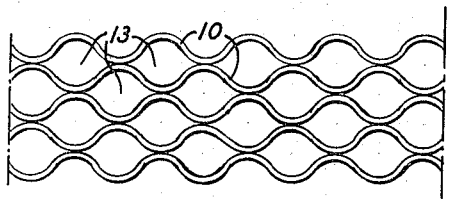
FIG. 3 is a modification of a cellular laminate in which the intermediate flat sheet of FIG. 1 is omitted, but the bottom of each dip of a corrugation is adhered to the top of the rise of the next corrugated sheet to form a laminated cellular structure.

FIG. 3 shows a simple embodiment in which the flat separating sheets 12 are omitted and the cellular structure is formed by cohering the corresponding bottom dips of the corrugations to the top dip of the next corrugation of the adjacent lamina and so on to build a cellular body as in FIG. 3 with direct adhesion between the corrugated hills and depressions adhered to the corresponding hills and depressions of the next adjacent corrugated sheet of the laminate.

As described above, a hard resin coating on the sheet is applied in various ways such as by first dipping or spraying the sheets before lamination. The resin coating may sometimes be applied to the said sheets after lamination into cellular structure and then dried, or it may be applied and dried upon flat sheets and the corrugations emplaced upon the flat sheet by heating sufficient to soften the resinous coating and cohering into cellular form.

In an alternate method, the coating is applied to the cellular body merely by dipping the entire cellular laminated body into the liquid resin which is then allowed to set.

Figure 2:
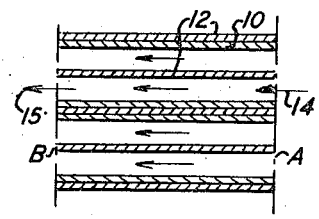
FIG. 2 is a section through FIG. 1 taken on the lines 2—2 of FIG. 1.
Figure 5:
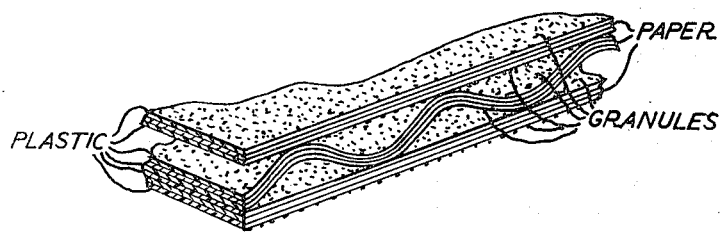
FIG. 5 is a detail illustrating the corrugated resin-coated assembly having the surfaces coated with resin and then coated with granules of fluid-modifying solids as described.

As shown in FIG. 5, the wet, tacky coating may be dusted with dry solid of powder or granular substance which adheres to the tacky resinous coating before final setting and, as the fluid passes from side to side of the cellular body, as shown in FIG. 2, it contacts the solid body and modifies its nature. For instance, if the solid body were a dry hydrous oxide such as silica gel or dried hydrous alumina, moisture would be absorbed from the gas. If a molecular sieve constituted the dry particles adhered and set in the wet resin, then the fluid which could be an aromatic containing petroleum distillate might have some of the aromatics absorbed in the molecular sieve, tending thereby to remove the aromatics from the fluid passing through the cellular body.

In still another alternate, the solids may be zeolites which have base exchange properties such as permutite or may comprise decolorizing clays such as Fuller's earth through which fluids are passed either to remove minerals or colors by absorption upon the solids.

In still another alternate, the hard coating resin per se may have base exchange properties such as the amberlite resins and so the fluid passed therethrough, such as acid liquids such as orange juice, may be passed therethrough for removal of citric acid or vitamin C, etc. Thus, it will be seen that the product hereof has wide utility as a cellular body in the treatment of various fluids, gases or liquids.

The granular solids adhered to the epoxy paper surfaces provide highly efficient transfer radially as each radial plane alternately moves between hot and cold fluids. The packing, on the other hand, is a poor conductor of heat in axial or fluid flow direction as the paper and epoxy are poor heat conductors. As the adhered solids which readily take up or give off heat do not have continuity in axial or fluid flow direction, that heat is contained in each radial plane and is not lost axially by the heat insulating properties of the entire packing.

Another outstanding feature of this invention is that it provides a high efficiency moisture transfer packing when the adhered solids are of fine mesh high capacity desiccant granules which are in immediate surface contact with vapor flowing over the surfaces. This enables rapid absorption and desorption and rapid vapor pressure equalization occurs between fluid vapor pressure and desiccant vapor pressure without the inherent delay associated with internal diffusion resistances which have to be contended with when a gas flows through a packed granular bed rather than over boundary surfaces.

The following examples illustrate the practice of this invention.

EXAMPLE I

Porous uncalendared paper is corrugated with fine corrugations and is assembled with a continuous flat sheet of paper of the same quality, the corrugated and flat pair of sheets being rolled into a coiled body as shown in FIG. 6 wherein the corrugated sheet becomes separated by the flat sheet from the next layer of corrugations and a laminated body is thus produced of whatever size is desired, depending upon the number of layers in the coiled structure. Each corrugation extends from one cylindrical end of the coiled body to the opposite end, each corrugation forming a cell independent and with no lateral flow between cells. The coiled laminated body is then dipped in a liquid epoxy resin, typically Shell Epon 834, having an epoxy equivalent of about 250, the resin being dissolved as a 70 percent solution in butyl carbitol to which about 5 weight percent of metaphenylene diamine is added just prior to use. The epoxy coated product is dried in storage, evaporating the solvent, and allowing the resin to cure, and hard set into a fire-resistant, heat transferring coating. The coated cellular structure is a quite hard, structurally strong cellular body after about 3 hours storage time, and is useful as a rotary heat exchange packing.

EXAMPLE II

Example I is repeated except that following wetting of the rotary packing with the epoxy resin containing the drier, it is sprayed while the coating is still wet and tacky with fine granules of absorbent silica gel and the resin is then allowed to set. The rotary packing after removing some unadhered particles of silica gel with which it was dusted, is now used as a moisture absorbent type packing passing ambient air through one radial portion as the packing rotates, and simultaneously passing regeneration or scavenging air through an opposite radial portion for removing the absorbent moisture in a manner known in the art. See, for instance, the U.S. Pat. to Pennington, No. 2,700,537.

EXAMPLE III

A laminated bond formed of corrugated paper alternating with flat sheets but not coiled as shown in FIG. 2 are assembled as rectangular sheets comprising the fill in a cooling tower through which the fine film of water is sprayed down through the top, countercurrent to gas passing upward from the bottom for purposes of heat transfer. The packing is found to be typically effective for this purpose as known for usual cooling tower fills and the product has a long, ruggedly useful life as a cooling tower fill.

As thus described, a paper impregnated with a hard-setting resin of good heat capacity to transfer its heat such as epoxy resin is found to be strong and ruggedly useful for various mechanical purposes in which a packing is useful, and it is particularly outstanding for such structures in which good heat exchange qualities are useful. The product, of course, is strong and may be fireproof and have very high structural strength.

It is sometimes useful to add 10 to 25 percent of a filter in the resin for purposes largely of modifying the heat-exchange properties. For instance, such fillers as metal powders, typically aluminum, zinc or copper dust are usefully added for modification of the heat exchange properties of the plastic coating on the paper.

As described in Examples II and III, the dusted material may be of different characteristics applied for different purposes. For instance, the absorbing moisture may be any kind of hydrous oxide capable of absorbing moisture which could be substituted for the silica gel. For treatment of fluids such as liquids wherein acids or bases or metallic components of the fluid are to be removed by the resin, then an ion exchange resin such as amberlite would be used entirely or as part of the exposed portion of the resin. For instance, it is possible first to coat with epoxy in thin film, allow the epoxy film to solidify, and harden, and then apply a second coating of a liquid solution of an amberlite resin which sets upon the undercoating of epoxy and thereby imparts ion exchange properties to the cellular body.

Instead of hydrous oxides to absorb moisture, the porous hydrous oxides may be wet with a humectant such as glycol or ethylene glycol, tending to evolve moisture. Alternately, of course, as mentioned, the dry powder or granules may have a selective absorption such as molecular sieves, decolorizing clays such as Fuller's earth, and the like.

Various modifications will occur to those skilled in the art and, accordingly, it is requested that the specification and examples herein be regarded as exemplary except as specifically defined in the claims appended hereto.

What is claimed is:

1. Fluid treatment packing comprising a laminated cellular structure formed of paper sheets assembled into a laminated body in which each layer is spaced from the next by cellular spacing structure between the layers, the cellular spacing structure extending from one side of the packing to an opposite side for easy fluid passage therethrough, said paper sheets being impregnated and coated with a moisture-impervious continuous organic resinous film hard set upon said paper in laminated form, said film encapsulating the paper and strengthening and bonding the paper into a rugged stable self-supporting laminated structure, said resinous film having inert particles bonded by said resin to the exposed film surface.

2. Fluid treatment packing comprising a laminated cellular structure formed of paper sheets corrugated and assembled into a laminated body whereby the corrugations provide cells between the layers extending from one side of the packing to an opposite side for easy fluid passage through said corrugations, said paper sheets being impregnated and coated with a cured, moisture-impervious continuous film of epoxy resin hard set upon said paper in laminated form, said epoxy resin film encapsulating the paper and strengthening and bonding the paper into a rugged, stable, self-supporting laminated structure, said resinous film having inert particles bonded by said resin to the exposed film surface.

3. A heat exchange and fluid treatment packing as defined in claim 1 wherein the packing is a resin coated laminate or corrugated paper alternating with layers of flat paper.

4. A heat exchange and fluid treatment packing as defined in claim 2 wherein the packing is a resin coated laminate of corrugated paper alternating with layers of flat paper.

5. A heat exchange and fluid treatment packing as defined in claim 1 wherein the packing is composed of a laminate of hard resin coated corrugated paper alternating with layers of hard resin coated flat paper, and coiled and set into a rotary body.

6. A heat exchange fluid treatment packing as defined in claim 2 wherein the packing is a laminate or corrugated paper alternating with layers of flat paper and coiled and set into a rotary body.

7. The structure as defined in claim 5 wherein the cells of said body extending from side to side have granular solids adhered upon the exposed resinous surfaces.

8. The structure as defined in claim 5 wherein the cells of said body extending from side to side have granular desiccant solids adhered upon the exposed resinous surfaces.

9. The structure as defined in claim 2 wherein the cells of said body extending from side to side have granular desiccant solids adhered upon the exposed resinous surfaces.

10. The structure as defined in claim 5 wherein the cells of said body extending from side to side have granular ion exchange solids adhered upon the exposed resinous surfaces.

11. Heat exchange and fluid treatment packing as defined in claim 1 wherein the resin has ion exchange properties.

12. A heat exchange and fluid treatment packing as defined in claim 1 wherein the granular solids adhered upon the exposed resinous surfaces are heat conductive solids.

13. A heat exchange and fluid treatment packing as defined in claim 7 wherein the granular solids adhered upon the exposed resinous surfaces are heat conductive solids.

* * * * *